US009853827B1

(12) United States Patent
Goodnow et al.

(10) Patent No.: US 9,853,827 B1
(45) Date of Patent: Dec. 26, 2017

(54) AUTOMATED DEVICE DISCOVERY ON A BUILDING NETWORK

(71) Applicant: Amazon Technologies, Inc., Seattle, WA (US)

(72) Inventors: Christopher Alon Goodnow, Bealeton, VA (US); Steven Richard Stolarski, Harpers Ferry, WV (US); Nicholas Ryan de Kanter, Purcellville, VA (US)

(73) Assignee: Amazon Technologies, Inc., Seattle, WA (US)

( * ) Notice: Subject to any disclaimer, the term of this patent is extended or adjusted under 35 U.S.C. 154(b) by 234 days.

(21) Appl. No.: 14/741,199

(22) Filed: Jun. 16, 2015

(51) Int. Cl.
G06F 15/16 (2006.01)
H04L 12/28 (2006.01)
G05B 15/02 (2006.01)
H04L 12/26 (2006.01)

(52) U.S. Cl.
CPC .......... *H04L 12/2803* (2013.01); *G05B 15/02* (2013.01); *H04L 43/0811* (2013.01)

(58) Field of Classification Search
CPC .. H04L 12/2803; H04L 43/0811; G05B 15/02
See application file for complete search history.

(56) References Cited

U.S. PATENT DOCUMENTS

| 9,429,960 B2* | 8/2016 | Liu | G06F 17/5004 |
| 2008/0228908 A1* | 9/2008 | Link | H04L 41/046 |
| | | | 709/223 |
| 2009/0271365 A1* | 10/2009 | Chen | G06F 9/4443 |
| 2013/0077529 A1* | 3/2013 | Lueckenhoff | H04L 67/16 |
| | | | 370/255 |
| 2014/0067133 A1* | 3/2014 | Liu | G06F 17/5004 |
| | | | 700/276 |
| 2014/0222906 A1* | 8/2014 | Isler | H04L 67/16 |
| | | | 709/203 |
| 2014/0282458 A1* | 9/2014 | Gupta | G06F 8/65 |
| | | | 717/168 |
| 2015/0039752 A1* | 2/2015 | Hague | H04L 12/403 |
| | | | 709/224 |
| 2015/0241856 A1* | 8/2015 | Walser | G05B 15/02 |
| | | | 700/275 |

OTHER PUBLICATIONS

Bill Swan, "The Language of BACnet-Objects, Properties and Services," <http://www.bacnet.org/Bibliography/ES-7-96/ES-7-96.htm>, 12 pages (accessed May 2, 2015).
Wikipedia, "BACnet," <http://en.wikipedia.org/wiki/BACnet>, 5 pages (accessed May 2, 2015).
Ashare, "PICS," <http://www.bacnet.org/DL-Docs/>, 2 pages (accessed May 13, 2015).

* cited by examiner

*Primary Examiner* — Mohamed Wasel
(74) *Attorney, Agent, or Firm* — Klarquist Sparkman, LLP

(57) ABSTRACT

Techniques and solutions are provided for performing automated device discovery over a network operating according to the building automation and control network (BACnet) protocol standard (a BACnet network). For example, automated device discovery on a BACnet network can be performed via automated processing of BACnet traffic without going through a manual discovery and configuration process, and without binding to BACnet devices. For example, who-is and I-am BACnet messages can be used to identify BACnet devices on the network and their property values can be read and displayed (e.g., in a dashboard interface). BACnet devices can also be queried to determine their supported properties.

19 Claims, 7 Drawing Sheets

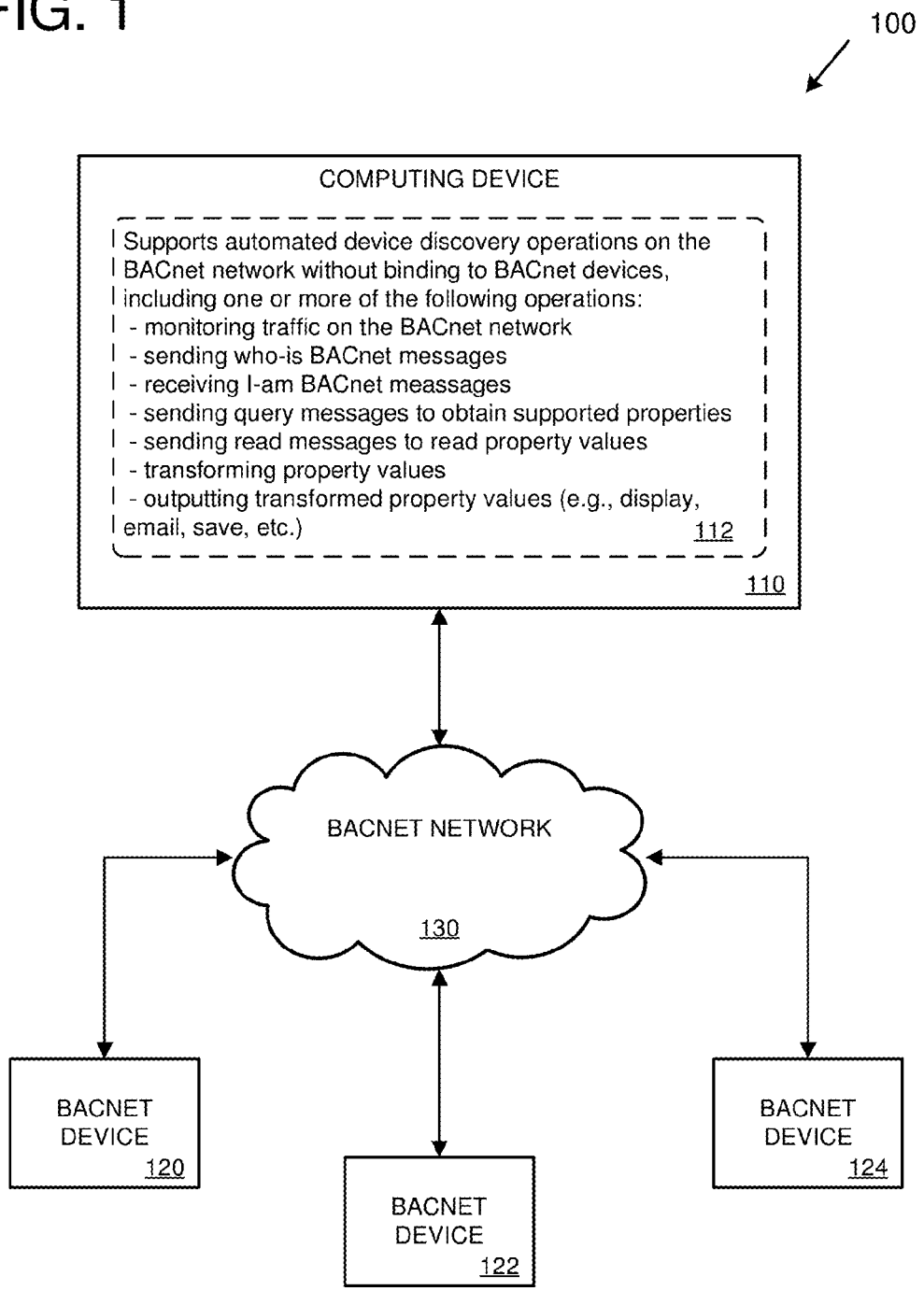

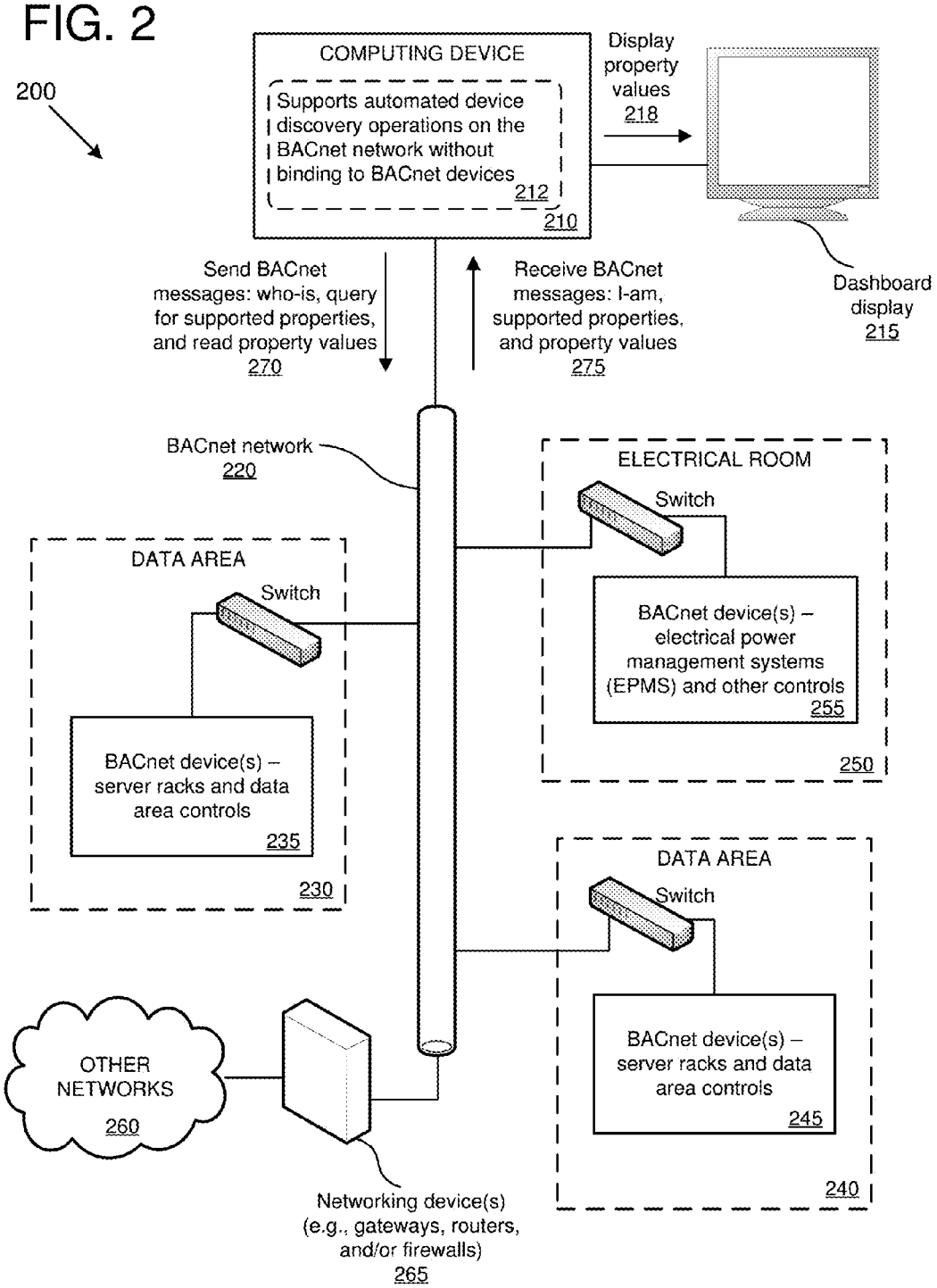

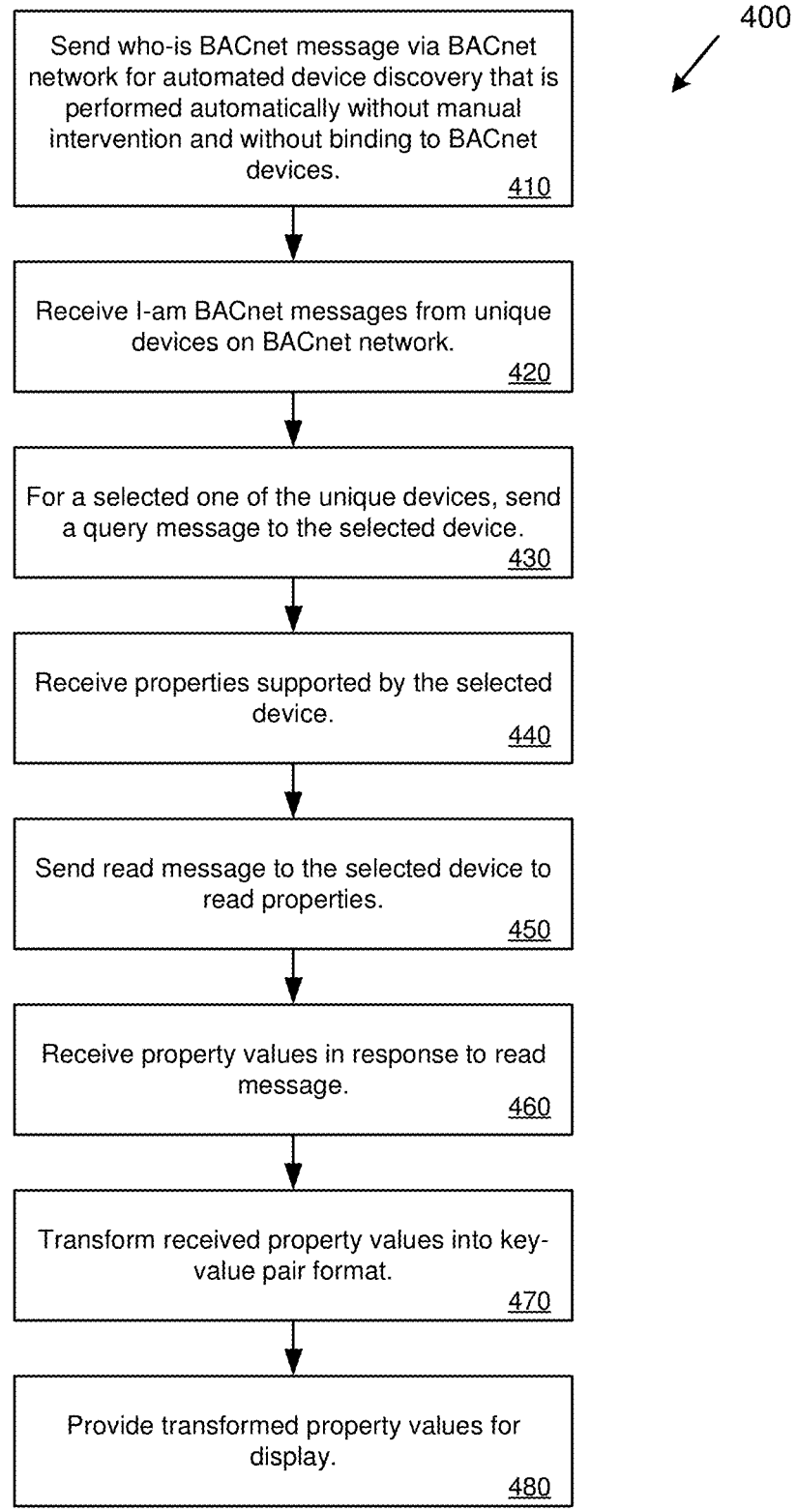

AUTOMATED DEVICE DISCOVERY ON A BUILDING NETWORK

BACKGROUND

Building automation and control protocols, such as the building automation and control network (BACnet) protocol standard, allow automation and control devices from different manufacturers to communicate using a standard protocol. For example, a BACnet network can be implemented in a building allowing various aspects of the building to be monitored and managed (e.g., temperature controls, heating, ventilating, and air conditioning controls, access controls, etc.).

However, configuring and maintaining a BACnet network of devices can be a time consuming and complicated task. For example, configuring BACnet devices involves a time consuming process during which a technician configures the devices to operate with various control systems. In addition, changes to the BACnet network or devices (e.g., device changes or the addition of new devices) can require additional setup and configuration effort.

BRIEF DESCRIPTION OF THE DRAWINGS

FIG. 1 is a diagram of an example environment supporting automatic device discovery over a network operating according to a building automation and control network (BACnet) protocol standard (a BACnet network).

FIG. 2 is a diagram of an example data center environment supporting automatic device discovery over a BACnet network.

FIG. 4 is a flowchart of an example method for performing operations for automated device discovery over a BACnet network, including displaying property values.

DETAILED DESCRIPTION

Overview

Figure 3A:
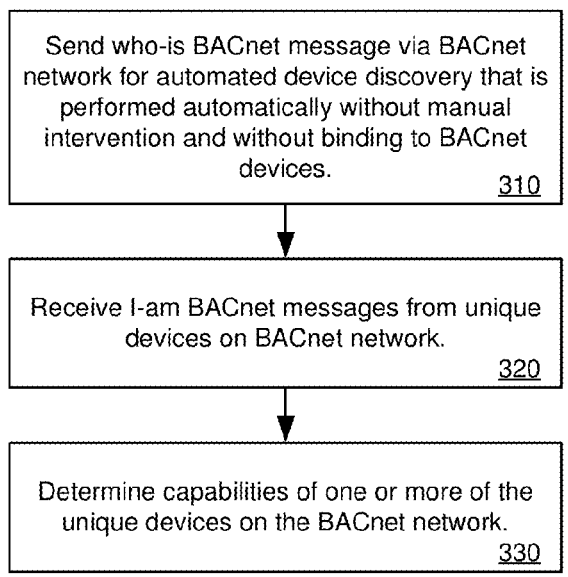
FIG. 3A is a flowchart of an example method for performing operations for automated device discovery over a BACnet network, including determining device capabilities.

The following description is directed to techniques and solutions for performing automated device discovery over a network operating according to a building automation and control protocol, for example, the building automation and control network (BACnet) protocol standard (a BACnet network). For example, automated device discovery on a BACnet network can be performed via automated processing of BACnet traffic without going through a manual discovery and configuration process, and without binding to BACnet devices. Automated device discovery on a BACnet network includes identifying BACnet devices, determining BACnet device capabilities (e.g., supported properties), reading property values, and/or performing other BACnet operations in an automated fashion. For example, who-is and I-am BACnet messages can be used to identify BACnet devices on the network, specific BACnet devices can be selected, and their property values can be read and displayed (e.g., in a dashboard interface). In some implementations, BACnet devices are interrogated (e.g., using query commands) to determine their supported properties.

BACnet is a data communication protocol for building automation and control networks. BACnet® is a registered trademark of the American Society of Heating, Refrigerating and Air-Conditioning Engineers (ASHRAE). BACnet is also an International Organization for Standardization standard (ISO 16484-5).

The BACnet protocol standard defines a data communication protocol for communicating with devices (e.g., automation and control devices) which may be provided by different manufacturers (e.g., third party manufacturers). For example, the devices can include heating, ventilation, and air conditioning (HVAC) devices, lighting devices, temperature control devices, security devices, access control devices, and/or other devices providing automation and control functionality.

A BACnet network is a communication network that operates according to the BACnet protocol standard. A BACnet network can be implemented using a number of different network technologies, including ARCNET, Ethernet (e.g., with communication performed using internet protocol (IP) and user datagram protocol (UDP) packets), and serial point-to-point networks. A BACnet network carries BACnet traffic. In some implementations, a BACnet network also carries other types of traffic (e.g., a common network infrastructure, including cables, routers, switches, etc., can carry BACnet traffic, e.g., using BACnet/IP, as well as other types of traffic, such as Internet-based TCP/IP traffic).

Typically, device discovery in a BACnet network is a manual process performed by a person (e.g., an administrator or technician that is setting up BACnet devices). During the manual discovery process (also called the BACnet "bind" procedure) BACnet devices on the BACnet network are bound to a particular controller (also called a "master controller"), with bind information stored in the particular controller's database (also called a "master database"). The manual bind procedures involves sending a who-is BACnet message (e.g., where the range of devices which should respond is not specified in the "who is" message so that all devices respond to the message), receiving I-am BACnet messages from BACnet devices on the network, and manually selecting BACnet devices for binding to the particular controller. For example, during the bind process, the administrator selects a particular BACnet device, instructs the controller to load the properties of the BACnet device, and manually configures the properties (e.g., selecting particular objects and associated properties of the device for including in the database, modifying property details, resolving addressing conflicts, resolving identifier duplication, and performing other manual configuration actions). The result of this manual discovery process is that the controller is bound to the BACnet device via the configuration settings in the controller's database. Depending on the configuration of the BACnet network multiple master controllers may be used, each controlling different types of BACnet devices.

The manual device discovery procedure for binding BACnet devices can be described in relation to an example scenario of setting up a light switch controller. In the example scenario, a light switch controller is being bound to a number of light devices (individual BACnet light devices on a BACnet network) by an administrator. The manual process involves sending out a who-is BACnet message and receiving I-am BACnet messages from all BACnet devices on the network (e.g., light switch devices, alarm devices, temperature devices, etc.). The administrator selects the desired light devices from all of the responding BACnet devices for binding to the light switch controller (a master controller for light switch devices) and retrieves the properties for the light switch devices. The administrator then configures the light switch device settings at the light switch controller (e.g., configures property settings, which could include brightness settings, on-off timer values, etc.) for storing in the database of the light switch controller. Once the manual device discovery procedure is complete, the light switch controller is bound to the light switch devices and is capable of controlling the light switch devices according to the properties that were setup by the administrator.

As discussed above, the manual BACnet device discovery procedure in which BACnet devices are bound to a controller can be a time consuming and computing resource intensive procedure. For example, during the manual discovery process a person manually binds the BACnet devices to a particular controller and manually configures various settings. In addition, the manual discovery process results in increased network traffic (e.g., due to all BACnet devices responding to the who-is message), increased processor utilization (e.g., during the discovery and configuration process), and increased memory and storage utilization (e.g., for processing and storing the database of bound devices).

Instead of a manual device discovery procedure, the technologies described herein provide an automated BACnet device discovery process that does not bind devices to a particular controller and that does not utilize a database of bound devices. For example, available BACnet devices on a BACnet network can be automatically identified, supported properties can be automatically determined, and property values can be automatically retrieved and displayed. In this way, various BACnet devices on the BACnet network can be automatically managed, including BACnet devices from third-party manufacturers. In addition, BACnet devices do not have to be altered or modified to support the automated discovery technologies described herein.

For example, instead of a manual discovery procedure for binding BACnet devices to a BACnet controller, the technologies described herein can be implemented to perform real-time monitoring of a BACnet network. For example, a computing device on the network can automatically perform real-time monitoring of BACnet messages, dynamically identify BACnet devices, dynamically determine their supported properties and read their property values, and/or dynamically display the property values (e.g., in a dashboard interface). Providing low-impact real-time monitoring of BACnet traffic (instead of a manual bind procedure) allows automated device discovery on the BACnet network to be performed efficiently and without binding to BACnet devices.

The automated device discovery technologies described herein can provide various benefits. For example, BACnet devices can be automatically discovered and managed without having to go through a manual setup and configuration procedure (e.g., saving time). In addition, computing resources can be saved, including network bandwidth (e.g., by using fewer BACnet messages, such as by determining capabilities and reading properties of selected BACnet devices, and not for all BACnet devices as would be done with a manual discovery procedure), processor utilization (e.g., by avoiding the manual discovery procedure which processes more BACnet messages), and/or memory and storage (e.g., by not storing a database of bound BACnet devices).

Environments for Automated Device Discovery Over a BACnet Network

In any of the implementations described herein, automatic device discovery over a BACnet network can be performed within environments where BACnet devices, as well as other types of computing devices, are connected via a BACnet network. For example, a BACnet network environment can be maintained by a business or organization for monitoring and controlling building automation devices. In some implementations, a BACnet network can also carry non-BACnet traffic. For example, an IP based network can carry BACnet traffic as well as other types of IP traffic (e.g., TCP/IP traffic among other types of computing devices, such as server computers, desktops and laptops, tablets, networking equipment, etc.).

FIG. 1 is a diagram of an example environment 100 supporting automatic device discovery over a BACnet network 130. For example, the BACnet network 130 can be part of a network of a business connecting BACnet devices for performing building automation operations. In the example environment 100, the BACnet network 130 is connected to a number of BACnet devices, including BACnet devices 120, 122, and 124. For example, the BACnet devices can be temperature sensor devices, HVAC control devices, lighting devices, alarm devices, access control devices, and/or other types of devices supporting the BACnet protocol standard.

In the example environment 100, a computing device 110 is connected to the BACnet network 130. The computing device 110 is configured to perform operations for automated device discovery on the BACnet network 130. The computing device 110 performs the operations for automated device discovery without binding to BACnet devices (e.g., without binding to BACnet devices 120, 122, or 124). In addition, the computing device 110 does not maintain a database of bound BACnet devices.

The computing device 110 can be any type of computing device that is configured (e.g., via software and/or hardware) to perform the automated BACnet device discovery operations described herein. In some implementations, the computing device 110 is associated with a display for displaying information obtained from the BACnet devices (e.g., for displaying property values obtained from BACnet devices 120, 122, and 124). For example, the computing device 110 can be a "dashboard" of a data center that displays status information (e.g., property values, such as temperature, humidity, fan speed, etc.) for the various BACnet devices.

As depicted at 112, the computing device 110 supports operations for automated device discovery on the BACnet network 130. The computing device 110 can perform one or more of the operations depicted at 112 separately or in combination. The operations depicted at 112 include monitoring traffic on the BACnet network 130. For example, the computing device 110 can monitor BACnet traffic (e.g., I-am messages, read property messages, write property messages, and/or other types of BACnet messages) without binding with BACnet devices on the BACnet network 130 and without maintaining a database of bound devices. In other words, the computing device 110 can perform the automated device discovery operations without being a BACnet controller that is bound to BACnet devices.

The operations depicted at 112 also include sending who-is BACnet messages and receiving I-am BACnet messages in response. For example, if the computing device 110 sends a who-is BACnet message via the BACnet network 130, BACnet devices 120, 122, and 124 will respond with I-am BACnet messages. From the I-am BAC messages, the computing device 110 can determine the unique device identifiers (the BACnet device object identifiers) for each of the BACnet devices (120, 122, and 124).

The operations depicted at 112 also include sending query messages to obtain supported properties. For example, the query messages can include epics messages. An epics (Electronic Protocol Implementation Conformance Statement) message is a BACnet command that identifies a particular BACnet device on the network and obtains the BACnet capabilities of the particular BACnet device. An epics command obtains BACnet capabilities of the identified BACnet device including supported objects and their associated properties. For example, the computing device 110 can send BACnet messages to one or more of the BACnet devices 120, 122, and 124 (e.g., query messages, which are epics messages in some implementations, that identify one or more of the specific BACnet devices by their unique device identifiers) to obtain their supported properties (e.g., to obtain BACnet object and associated property information).

The operations depicted at 112 also include sending read messages to read property values. For example, read messages (e.g., ReadProperty messages and/or ReadPropertyMultiple messages) can be sent to one or more of the BACnet devices 120, 122, and 124 (e.g., read messages that identify one or more of the specific BACnet devices by their unique device identifiers) to obtain the property values for one or more properties (e.g., an outside temperature value for an outside temperature property).

The operations depicted at 112 also include transforming property values received from the BACnet devices. For example, transforming the property values can comprise converting the property values from a BACnet data format to a key-value pair format. In a specific implementation, the property values are converted to into the JavaScript object notation (JSON) format.

In order to illustrate transforming a property value from a BACnet format to a key-value pair format, consider an example of reading an air temperature property from a particular BACnet device. In this example, the following BACnet "read property" command is sent:
./bacrp 2100000 2 1 85
In the above command, "2100000" is the BACnet device ID, "2" references the analog value for the air temperature, "1" references the first analog value, and "85" references the present value for the air temperature property. In response to the BACnet read property command, the air temperature value is received (e.g., 91.89 degrees). The received temperature value is then converted to the key-value pair format:
Air Temperature, 91.89

The operations depicted at 112 also include outputting transformed property values. For example, the transformed property values can be displayed (e.g., via a local or more dashboard display), emailed (e.g., to an administrator), saved (e.g., to a log file), etc.

The operations depicted at 112 can be performed automatically by the computing device 110 without manual intervention. For example, an administrator is not needed to send who-is messages or selected devices to bind to the computing device 110. Instead, the operations depicted 112 can be performed automatically, without user intervention, without binding to BACnet devices, and without creating a database of BACnet devices. For example, using one or more of the operations depicted at 112, the computing device can automatically monitor BACnet traffic on the BACnet network 130, automatically send who-is BACnet messages and receive I-am BACnet messages, automatically send query messages to obtain supported properties, automatically send read messages to read property values, automatically transform property values, automatically output transformed property values (e.g., via a dashboard display), automatically write to property values, and/or automatically perform other operations in relation to the BACnet network 130 and the BACnet devices (e.g., BACnet devices 120, 122, and 124).

FIG. 2 is a diagram of an example data center environment 200 supporting automatic device discovery over a BACnet network 220. For example, the BACnet network 220 can be part of a data center network to monitor and control various functions of the data center and/or other building facilities. In the example environment 200, the BACnet network 220 is connected to a number of BACnet devices in various locations. For example, BACnet devices are located in data areas (e.g., collections of server computers, or server racks, and associated equipment, which can also be called "pods"), including BACnet devices 235 in data area 230 and BACnet devices 245 in data area 240. For example, the BACnet devices 235 in data area 230 can include devices for measuring temperature (e.g., inside air temperature, outside air temperature, cold aisle temperature, and hot aisle temperature) and humidity, controlling air flow, etc. BACnet devices are also located in other locations of the data center environment 200, including BACnet devices 255 located in, or associated with, electrical room 250. The BACnet devices 255 located in the electrical room 250 can include BACnet devices associated with electrical power management systems (EPMS). The data center environment 200 can include BACnet devices other than, or in addition to, those depicted and/or BACnet devices in locations other than those depicted.

In the example data center environment 200, a computing device 210 is connected to the BACnet network 220. The computing device 210 is configured to perform operations for automated device discovery on the BACnet network 210. The computing device 210 performs the operations for automated device discovery without binding to BACnet devices (e.g., without binding to BACnet devices 235, 245, or 255). In addition, the computing device 210 does not maintain a database of bound BACnet devices. For example, the computing device 210 performs automated processing of BACnet traffic without going through the manual discovery and bind procedure for binding BACnet devices.

The computing device 210 can be any type of computing device that is configured (e.g., via software and/or hardware) to perform the automated BACnet device discovery operations described herein. In the example data center environment 200, the computing device 210 is connected to a dashboard display 215 for displaying information (e.g., property values, such as temperature, humidity, electrical system information, air flow information, etc.) obtained from the BACnet devices on the BACnet network 220.

As depicted at 212, the computing device 210 supports operations for automated device discovery on the BACnet network 220 without binding to BACnet devices. As depicted at 270, the computing device 210 is configured to send BACnet messages including who-is messages, query messages for determining supported properties of BACnet devices, and read property messages (e.g., ReadProp and ReadPropMultiple BACnet messages) for reading property values of BACnet devices. As depicted at 275, the computing device 210 is configured to receive BACnet messages including I-am messages from BACnet devices, messages from BACnet devices identifying supported properties, and messages from BACnet devices containing property values. As depicted at 218, the property values can be displayed at a dashboard display 215 (e.g., a local or remote computer display). In some implementations, the property values are converted from a BACnet format into a key-value pair format (e.g., the JSON format) in preparation for display or output (e.g., sending via email, saving to a file, etc.).

In some implementations, the BACnet network 200 is connected to other networks 260 via networking devices 265 (e.g., gateways, routers, and/or firewalls). For example, the other networks 260 can include TCP/IP networks carrying Internet traffic and/or local traffic (e.g., local data center TCP/IP traffic). In some implementations, BACnet devices are located on, or reachable via, the other networks 260 and can be accessed by the computing device 210 and included in the automated device discovery operations.

Methods for Automated Device Discovery Over a BACnet Network

In any of the technologies described herein, methods can be provided for automatic device discovery over a BACnet network. For example, a BACnet network environment can be maintained by a business or organization for monitoring and controlling building automation devices. In some implementations, a BACnet network can also carry non-BACnet traffic. For example, an IP based network can carry BACnet traffic (e.g., using BACnet/IP) as well as other types of IP traffic (e.g., TCP/IP traffic among other types of computing devices, such as server computers, desktops and laptops, tablets, networking equipment, etc.).

FIG. 3A is a flow chart of an example method 300 for performing operations for automated device discovery over a BACnet network. For example, the method 300 can be performed by a computing device that monitors BACnet traffic on a BACnet network, such as computing device 110 or 210. The example method 300 is performed automatically without manual intervention and without binding to BACnet devices.

At 310, a who-is BACnet message is sent via a BACnet network. At 320, I-am BACnet messages are received from unique BACnet devices on the BACnet network. At 330, capabilities of one or more of the unique devices on the BACnet network are determined. For example, the I-am BACnet messages can be used, at least in part, to determine the capabilities of the one or more unique BACnet devices (e.g., using Vendor_Identifier property values from the I-am BACnet messages). As another example, the one or more unique devices can be interrogated to determine their capabilities (e.g., query messages can be sent identifying the one or more unique BACnet devices and supported properties can be received in response).

Figure 3B:
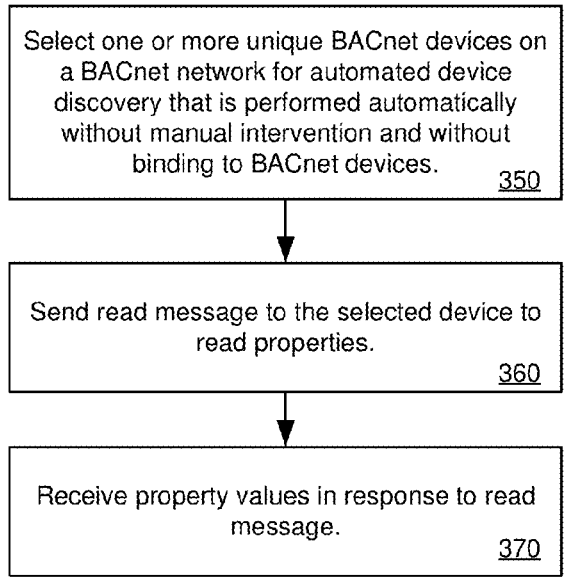
FIG. 3B is a flowchart of an example method for performing operations for automated device discovery over a BACnet network, including reading property values.

FIG. 3B is a flow chart of an example method 340 for performing operations for automated device discovery over a BACnet network. For example, the method 340 can be performed by a computing device that monitors BACnet traffic on a BACnet network, such as computing device 110 or 210. The example method 340 is performed automatically without manual intervention and without binding to BACnet devices.

At 350, one or more unique BACnet devices are selected. For example, the one or more unique BACnet devices can be selected based on their supported properties (e.g., using results of the example method 300).

At 360, for each of the one or more selected devices, a read message is sent to the selected device. For example, the read message can be a ReadProperty BACnet message or a ReadPropertyMultiple BACnet message that identifies the selected device (e.g., via its device object identifier).

At 370, for each of the one or more selected devices, property values are received in response to the read message. For example, the property values can be provided for display (e.g., after being transformed into a key-value pair format), sent via email, or saved to a file.

FIG. 4 is a flow chart of an example method 400 for performing operations for automated device discovery over a BACnet network. For example, the method 400 can be performed by a computing device that monitors BACnet traffic on a BACnet network, such as computing device 110 or 210. The example method 400 is performed automatically without manual intervention and without binding to BACnet devices. The example method 400 can also be performed automatically without maintaining a database of bound BACnet devices.

At 410, a who-is BACnet message is sent via a BACnet network. At 420, I-am BACnet messages are received from unique BACnet devices on the BACnet network.

At 430, a query message is sent to a selected one of the unique devices. For example, the query message can comprise an epics message. The unique device selected at 430 can be selected based on the received I-am BACnet messages (e.g., based on Vendor_Identifier property values) and a number of operations can be performed for the selected devices, including operations depicted at 430 through 480. Operations depicted at 430 through 480 can also be performed for one or more additional selected unique devices.

At 440, an indication of the properties supported by the selected device is received. For example, the indication can comprise a list of BACnet objects and their associated properties.

At 450, a read message is sent to the selected device (e.g., by referencing the unique device identifier of the selected device) to read one or more properties of the selected device. For example, the read message can be a ReadProperty message or a ReadPropertyMultiple message.

At 460, property values are received in response to the read message.

At 470, the received property values are transformed into a key-value pair format. For example, the received property values can be transformed from a BACnet data format into a JSON format.

At 480, the transformed property values are provided for display. For example, the transformed property values can be provided for display at a data center dashboard.

Figure 5:
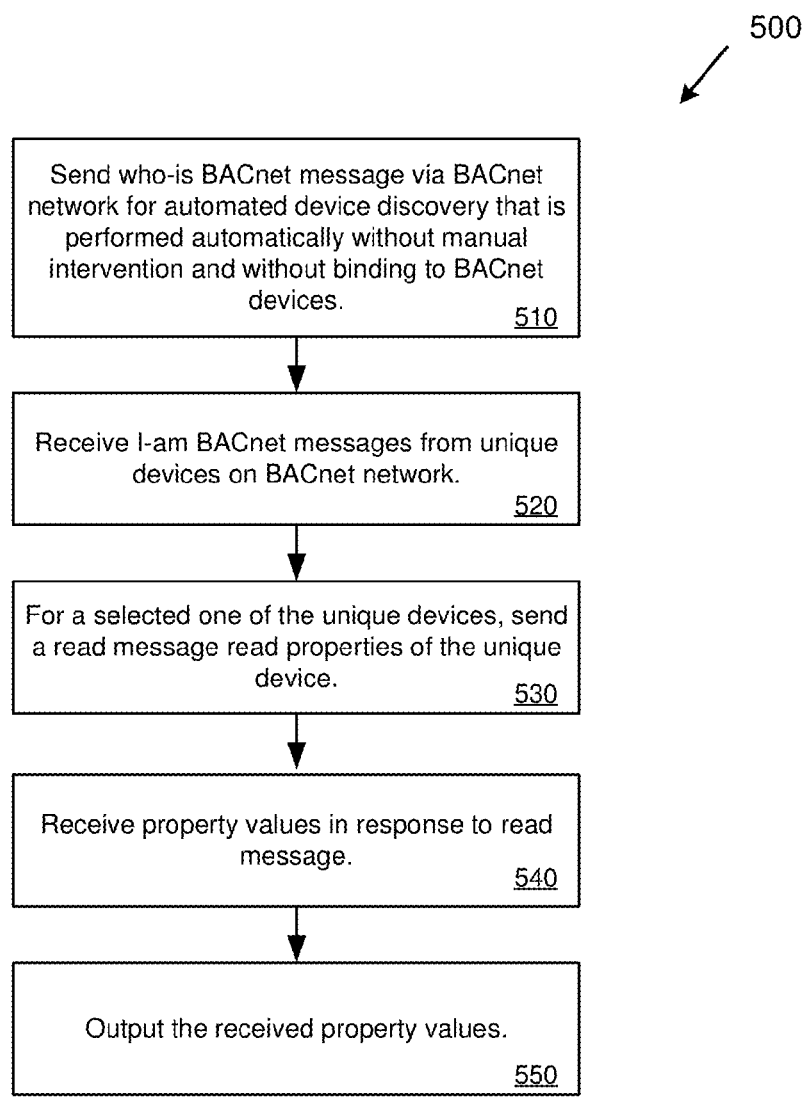
FIG. 5 is a flowchart of an example method for performing operations for automated device discovery over a BACnet network.

FIG. 5 is a flow chart of an example method 500 for performing operations for automated device discovery over a BACnet network. For example, the method 500 can be performed by a computing device that monitors BACnet traffic on a BACnet network, such as computing device 110 or 210. The example method 500 is performed automatically without manual intervention and without binding to BACnet devices. The example method 500 can also be performed automatically without maintaining a database of bound BACnet devices.

At 510, a who-is BACnet message is sent via a BACnet network. At 520, I-am BACnet messages are received from unique BACnet devices on the BACnet network.

At 530, a read message is sent to a selected one of the unique devices (e.g., by referencing the unique device identifier of the selected device) to read properties of the selected device. For example, the read message can be a ReadProperty message or a ReadPropertyMultiple message. The unique device can be selected based at least in part on the received I-am BACnet messages. For example, the unique device can be selected based on its vendor identifier (e.g., its Vendor_Identifier property value), based on its device identifier, and/or based on other information (e.g., based on query information sent to the unique devices to obtain supported BACnet object and property information).

At 540, property values are received from the selected device in response to the read message.

At 550, received property values are output. For example, the property values can be displayed (e.g., after being transformed into a key-value format), sent to another device, saved to a file, etc.

In some implementations, operations for automated device discovery are performed according to an open protocol building standard (e.g., the BACnet protocol standard or another open protocol building standard). For example, the operations can comprise sending a request message via the network and receiving response messages in return from unique devices on the network. One or more devices can be selected for sending a read message to read supported properties and property values can be received in return. The property values can be output (e.g., provided for display in a dashboard). The operations for automated device discovery are performed automatically and without manual intervention. Furthermore, the operations for automated device discovery are performed without binding with the unique devices. Thus, although many of the disclosed embodiments are described in the context of the BACnet protocol standard, further embodiments using similar principles can use other open protocol building standards.

Example Service Provider Environments

Figure 6:
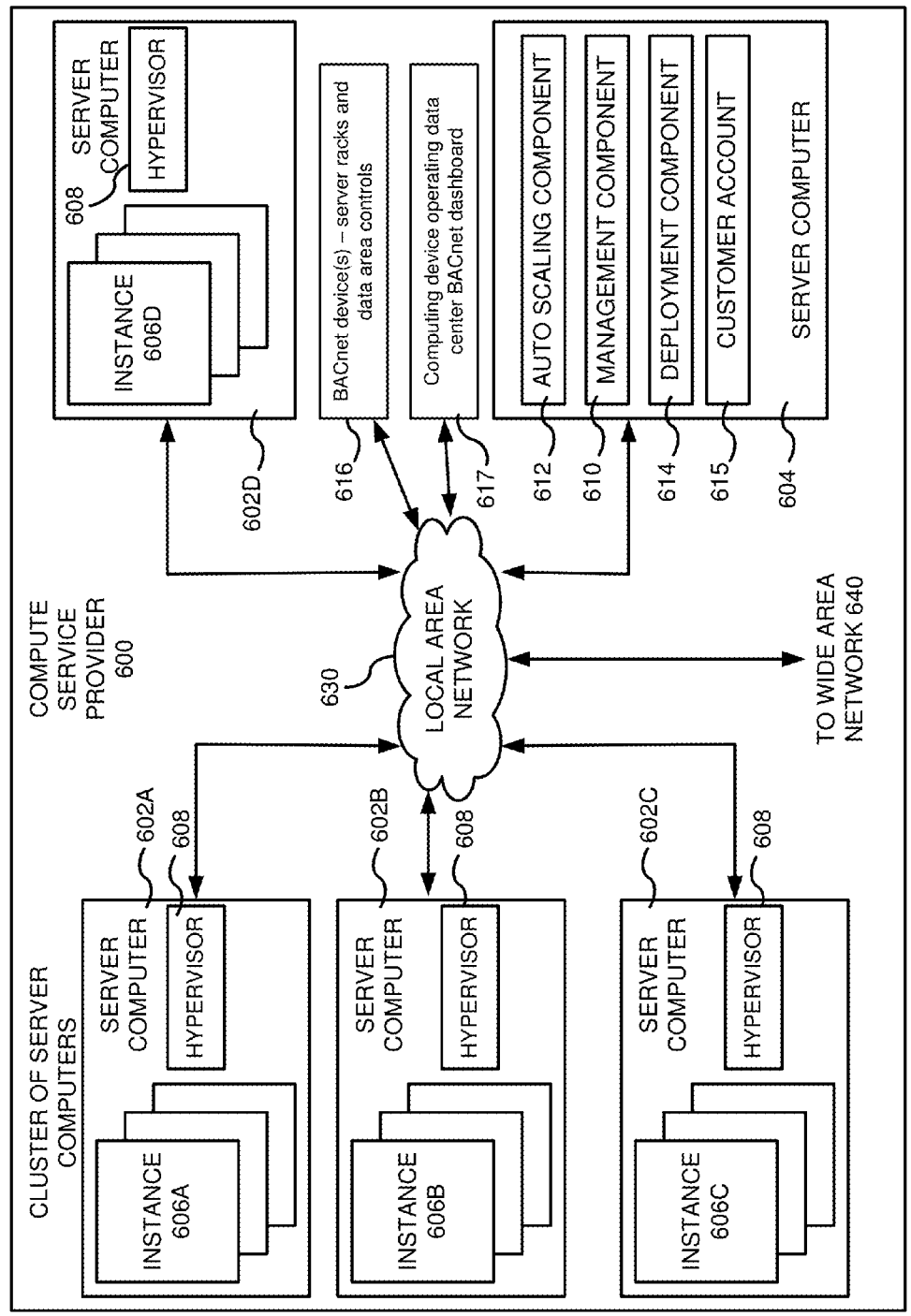
FIG. 6 is an example system diagram showing a plurality of virtual machine instances running in a multi-tenant environment.

FIG. 6 is a computing system diagram of a network-based compute service provider 600 that illustrates one environment in which embodiments described herein can be used. By way of background, the compute service provider 600 (i.e., the cloud provider) is capable of delivery of computing and storage capacity as a service to a community of end recipients. In an example embodiment, the compute service provider can be established for an organization by or on behalf of the organization. That is, the compute service provider 600 may offer a "private cloud environment." In another embodiment, the compute service provider 600 supports a multi-tenant environment, wherein a plurality of customers operate independently (i.e., a public cloud environment). Generally speaking, the compute service provider 600 can provide the following models: Infrastructure as a Service ("IaaS"), Platform as a Service ("PaaS"), and/or Software as a Service ("SaaS"). Other models can be provided. For the IaaS model, the compute service provider 600 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 600 using networked client devices, such as desktop computers, laptops, tablets, smartphones, etc. running web browsers or other lightweight client applications. Those skilled in the art will recognize that the compute service provider 600 can be described as a "cloud" environment.

The particular illustrated compute service provider 600 includes a plurality of server computers 602A-602D. While only four server computers are shown, any number can be used, and large centers can include thousands of server computers. The server computers 602A-602D can provide computing resources for executing software instances 606A-606D. In one embodiment, the instances 606A-606D are virtual machines. As known in the art, a virtual machine is an instance of a software implementation of a machine (i.e. a computer) that executes applications like a physical machine. In the example, each of the servers 602A-602D can be configured to execute a hypervisor 608 or another type of program configured to enable the execution of multiple instances 606 on a single server. For example, each of the servers 602A-602D can be configured (e.g., via the hypervisor 608) to support one or more virtual machine slots, with each virtual machine slot capable of running a virtual machine instance (e.g., server computer 602A could be configured to support three virtual machine slots each running a corresponding virtual machine instance). Additionally, each of the instances 606 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 604 can be reserved for executing software components for managing the operation of the server computers 602 and the instances 606. For example, the server computer 604 can execute a management component 610. A customer can access the management component 610 to configure various aspects of the operation of the instances 606 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 612 can scale the instances 606 based upon rules defined by the customer. In one embodiment, the auto scaling component 612 allows a customer to specify scale-up rules for use in determining when new instances should be instantiated and scale-down rules for use in determining when existing instances should be terminated. The auto scaling component 612 can consist of a number of subcomponents executing on different server computers 602 or other computing devices. The auto scaling component 612 can monitor available computing resources over an internal management network and modify resources available based on need.

A deployment component 614 can be used to assist customers in the deployment of new instances 606 of computing resources. The deployment component can have access to account information associated with the instances, such as who is the owner of the account, credit card information, country of the owner, etc. The deployment component 614 can receive a configuration from a customer that includes data describing how new instances 606 should be configured. For example, the configuration can specify one or more applications to be installed in new instances 606, provide scripts and/or other types of code to be executed for configuring new instances 606, provide cache logic specifying how an application cache should be prepared, and other types of information. The deployment component 614 can utilize the customer-provided configuration and cache logic to configure, prime, and launch new instances 606. The configuration, cache logic, and other information may be specified by a customer using the management component 610 or by providing this information directly to the deployment component 614. The instance manager can be considered part of the deployment component.

Customer account information 615 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 630 can be utilized to interconnect the server computers 602A-602D and the server computer 604. The network 630 can be a local area network (LAN) and can be connected to a Wide Area Network (WAN) 640 so that end users can access the compute service provider 600. It should be appreciated that the network topology illustrated in FIG. 6 has been simplified and that many more networks and networking devices can be utilized to interconnect the various computing systems disclosed herein.

In some implementations, the local area network 630 comprises a BACnet network. For example, the BACnet network can carry BACnet network traffic using dedicated networking equipment (e.g., separate data lines and protocols carrying BACnet traffic) and/or shared networking equipment (e.g., BACnet traffic can use the same data lines as regular data center TCP/IP traffic). Various BACnet devices 616 can be included in the compute service provider 600 environment, such as BACnet devices that monitor and control automation functionality for the server computers 602A-602D (e.g., temperature monitoring devices, air flow devices, etc.) and/or for other locations within the compute service provider 600 (e.g., electrical equipment monitoring and control, security control, etc.). Various computing devices of the compute service provider 600 can perform the various automated device discovery operations described herein. For example, a computing device 617 can be provided that performs automated device discovery on the BACnet network without binding to BACnet devices (e.g., automatically monitoring BACnet traffic, automatically sending who-is BACnet messages and receiving I-am BACnet messages in response, automatically determining supported properties of BACnet devices, automatically reading property values for selected BACnet devices, automatically transforming BACnet property values for display, and/or performing other BACnet operations related to the automated BACnet discovery functionality described herein).

Figure 7:
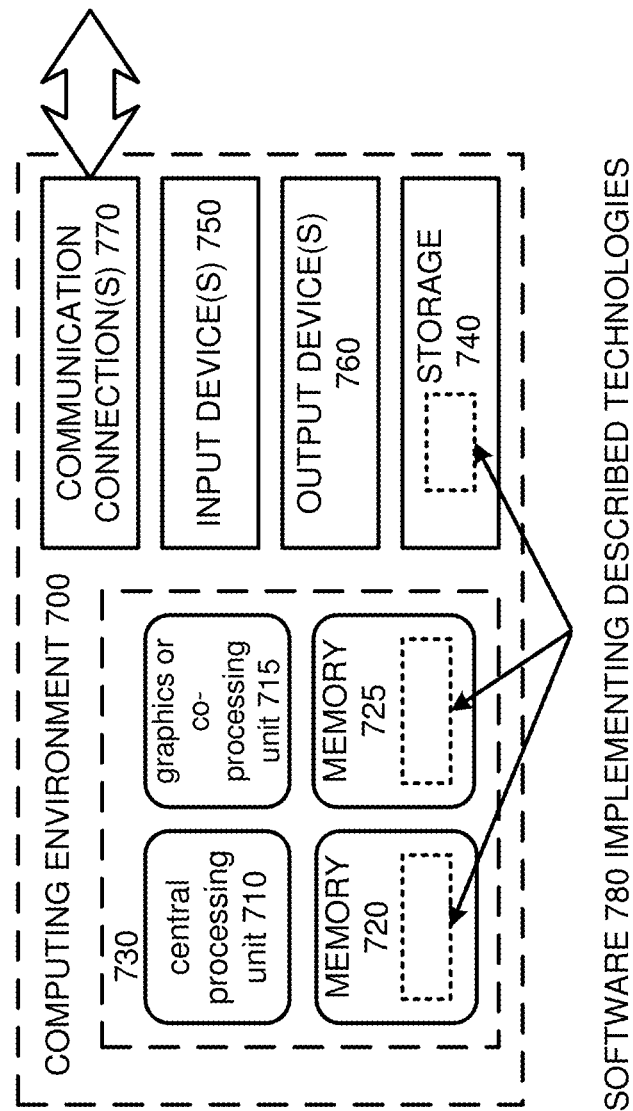
FIG. 7 depicts a generalized example of a suitable computing environment in which the described innovations may be implemented.

FIG. 7 depicts a generalized example of a suitable computing environment 700 in which the described innovations may be implemented. The computing environment 700 is not intended to suggest any limitation as to scope of use or functionality, as the innovations may be implemented in diverse general-purpose or special-purpose computing systems. For example, the computing environment 700 can be any of a variety of computing devices (e.g., desktop computer, laptop computer, server computer, tablet computer, etc.)

With reference to FIG. 7, the computing environment 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s).

A computing system may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing environment 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing environment 700. The output device(s) 760 may be a display, printer, speaker, CD-writer, or another device that provides output from the computing environment 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include signals and carrier waves, and does not include communication connections. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. Therefore, what is claimed as the invention is all that comes within the scope of these claims.

What is claimed is:

1. A method, implemented by a computing device, for performing automated device discovery over a network operating according to a building automation and control network (BACnet) protocol standard, the method comprising:
   monitoring real-time traffic on the BACnet network to dynamically identify, and obtain property values from, unique devices on the BACnet network without manual intervention and without binding the unique devices to a BACnet controller;
   sending a who-is BACnet message via the BACnet network;
   receiving, based at least in part on the monitoring, I-am BACnet messages from the unique devices, the unique devices identified by corresponding unique device identifiers, on the BACnet network; and
   for a selected one of the unique devices on the BACnet network:
      sending a query message to the selected unique device;
      in response to the query message, receiving, based at least in part on the monitoring, properties supported by the selected unique device;
      sending a read message to the selected unique device to read one or more of the properties supported by the selected unique device;
      receiving, based at least in part on the monitoring, property values for the one or more properties from the read message;
      transforming the received property values into a key-value pair format; and
      providing the transformed property values for display in a dashboard.

2. The method of claim 1 wherein sending the read message to the selected unique device comprises sending one of a Read Property BACnet message or a ReadPropertyMultiple BACnet message.

3. The method of claim 1 wherein the method is performed without maintaining a database of the unique devices on the BACnet network.

4. The method of claim 1 wherein transforming the received property values into a key-value pair format comprises transforming the received property values from a BACnet format into a JavaScript object notation (JSON) format.

5. The method of claim 1 further comprising, for each of one or more additional unique devices of the unique devices on the BACnet network:
   sending an additional query message to the additional unique device;
   in response to the additional query message, receiving properties supported by the additional unique device;
   sending an additional read message to the additional unique device to read one or more of the properties supported by the additional unique device;

receiving additional property values for the one or more properties supported by the additional unique device from the read message;

transforming the additional received property values into the key-value pair format; and providing the transformed additional property values for display in the dashboard.

6. The method of claim 1 wherein sending the query message to the selected unique device comprises sending an epics BACnet message to the unique device.

7. A computing device comprising:
one or more processing units; and
one or more network interfaces connected to a network operating according to a building automation and control network (BACnet) protocol standard;
wherein the computing device is configured to perform operations for automated device discovery over the BACnet network, the operations comprising:
monitoring real-time traffic on the BACnet network to dynamically identify, and obtain property values from, unique devices on the BACnet network without manual intervention and without binding the unique devices to a BACnet controller;
sending a request message via the BACnet network, wherein the request message is a broadcast message requesting that the unique devices on the BACnet network respond;
receiving, based at least in part on the monitoring, response messages from the unique devices, the unique devices identified by corresponding unique device identifiers, on the BACnet network; and
for a selected one of the unique devices on the BACnet network:
sending a read message to the selected unique device to read one or more properties supported by the selected unique device;
receiving, based at least in part on the monitoring, property values for the one or more properties from the read message;
converting the received property values into a key-value pair format; and
outputting the converted property values.

8. The computing device of claim 7 wherein outputting the received property values comprises providing the received property values for display.

9. The computing device of claim 7 the operations further comprising, before sending the read message to the selected unique device:
sending a query message to the selected unique device; and
in response to the query message, receiving properties supported by the selected unique device.

10. The computing device of claim 7 wherein the request message is a who-is BACnet message, and wherein the response messages are I-am BACnet messages.

11. The computing device of claim 10 the operations further comprising, before sending the read message to the selected unique device:
determining the one or more properties supported by the selected unique device based at least in part on a Vendor_Identifier property value from the I-am BACnet message received from the selected unique device.

12. The computing device of claim 10 wherein the computing device is configured to ignore who-is BACnet messages received by the computing device, and wherein the computing device does not respond to who-is BACnet messages.

13. The computing device of claim 10 wherein the operations for automated device discovery are performed without maintaining a database of the unique devices on the BACnet network.

14. A non-transitory computer-readable storage medium storing computer-executable instructions for causing a computing device comprising a network interface to perform operations for automated device discovery over a network operating according to a building automation and control network (BACnet) protocol standard, the operations comprising:
monitoring real-time traffic on the BACnet network to dynamically identify, and obtain property values from, unique devices on the BACnet network without manual intervention and without binding the unique devices to a BACnet controller;
sending a who-is BACnet message via the BACnet network;
receiving, based at least in part on the monitoring, I-am BACnet messages from the unique devices, the unique devices identified by corresponding unique device identifiers, on the BACnet network; and
for a selected one of the unique devices on the BACnet network:
sending a read message to the selected unique device to read one or more properties supported by the selected unique device; and
receiving, based at least in part on the monitoring, property values for the one or more properties from the read message;
converting the received property values into a key-value pair format; and
outputting the converted property values.

15. The non-transitory computer-readable storage medium of claim 14, the operations further comprising, before sending the read message to the selected unique device:
determining the one or more properties supported by the selected unique device based at least in part on the I-am BACnet message received from the selected unique device.

16. The non-transitory computer-readable storage medium of claim 14, the operations further comprising, before sending the read message to the selected unique device:
determining the one or more properties supported by the selected unique device based at least in part on a Vendor_Identifier property value from the I-am BACnet message received from the selected unique device.

17. The non-transitory computer-readable storage medium of claim 14, the operations further comprising, before sending the read message to the selected unique device:
sending a query message to the selected unique device; and
in response to the query message, receiving properties supported by the selected unique device.

18. The non-transitory computer-readable storage medium of claim 16, the operations further comprising:
when a who-is BACnet message is received, ignoring the who-is BACnet message.

19. The non-transitory computer-readable storage medium of claim 16, wherein the operations for automated device discovery are performed without maintaining a database of the unique devices on the BACnet network.

* * * * *